(12) United States Patent
Hashimoto

(10) Patent No.: US 10,574,954 B2
(45) Date of Patent: Feb. 25, 2020

(54) COMPENSATION METHOD FOR A SCANNING SYSTEM WITH SPATIAL LIGHT MODULATOR

(71) Applicant: SILICON LIGHT MACHINES CORPORATION, Sunnyvale, CA (US)

(72) Inventor: Yoshimi Hashimoto, Kyoto (JP)

(73) Assignee: Silicon Light Machines Corporation, Sunnyvale, CA (US)

(*) Notice: Subject to any disclaimer, the term of this patent is extended or adjusted under 35 U.S.C. 154(b) by 0 days.

(21) Appl. No.: 16/209,376

(22) Filed: Dec. 4, 2018

(65) Prior Publication Data

US 2019/0116346 A1 Apr. 18, 2019

Related U.S. Application Data

(60) Provisional application No. 62/752,939, filed on Oct. 30, 2018.

(51) Int. Cl.
| | |
|---|---|
| *H04N 9/31* | (2006.01) |
| *G02B 26/10* | (2006.01) |
| *G02B 13/00* | (2006.01) |
| *G02B 27/00* | (2006.01) |
| *G02B 26/08* | (2006.01) |

(52) U.S. Cl.
CPC ....... *H04N 9/3185* (2013.01); *G02B 13/0005* (2013.01); *G02B 26/0816* (2013.01); *G02B 26/10* (2013.01); *G02B 27/0031* (2013.01); *H04N 9/3132* (2013.01); *H04N 9/3135* (2013.01)

(58) Field of Classification Search
CPC .. H04N 9/3185; H04N 9/3132; H04N 9/3135; G02B 13/0005; G02B 28/0816; G02B 26/10; G02B 27/0031
USPC ........................................................ 348/756
See application file for complete search history.

(56) References Cited

U.S. PATENT DOCUMENTS

| 5,504,514 A * | 4/1996 | Nelson | B41J 2/465 347/130 |
|---|---|---|---|
| 5,920,361 A * | 7/1999 | Gibeau | G02B 26/10 348/750 |
| 2002/0057063 A1* | 5/2002 | Kitamura | G09G 1/04 315/364 |
| 2005/0281506 A1* | 12/2005 | Okazaki | G02B 6/4206 385/31 |

(Continued)

*Primary Examiner* — Michael Lee
(74) *Attorney, Agent, or Firm* — William Nuttle

(57) ABSTRACT

A multi-beam scanning system and methods of operating the same to compensate for distortion are provided. Generally, the method involves illuminating a spatial light modulator including SLM pixels arranged in parallel, each pixel including a multiple address pixels. Drive signals including image data are provided to the pixels to generate beams of modulated light reflected therefrom, which is scanned to a linear swath of a two-dimensional imaging plane using a collimate lens, a scan mirror moved about a first axis, and an imaging lens. The swath is scanned across the imaging plane in a direction orthogonal to a long axis of the swath by moving the scan mirror about a second axis. To compensate for distortion along the long axis of the swath compensated image data is provided to at least some of the address pixels generating beams of modulated light distal from an optical axis of the imaging lens.

20 Claims, 6 Drawing Sheets

(56) References Cited

U.S. PATENT DOCUMENTS

| | | | | |
|---|---|---|---|---|
| 2007/0024944 A1* | 2/2007 | Gupta | ............... | G02F 1/134309 |
| | | | | 359/237 |
| 2010/0225979 A1* | 9/2010 | Sandstrom | .......... | G03F 7/70291 |
| | | | | 358/474 |
| 2011/0013097 A1* | 1/2011 | Freeman | .............. | H04N 9/3129 |
| | | | | 348/745 |
| 2015/0185523 A1* | 7/2015 | Matsumoto | ........... | G02F 1/1313 |
| | | | | 359/238 |
| 2016/0004219 A1* | 1/2016 | Leister | .................... | G02B 5/32 |
| | | | | 359/9 |
| 2019/0082151 A1* | 3/2019 | Kishimoto | ............. | G03B 21/00 |

* cited by examiner

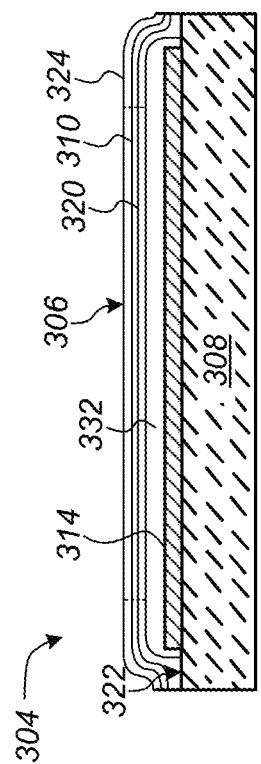
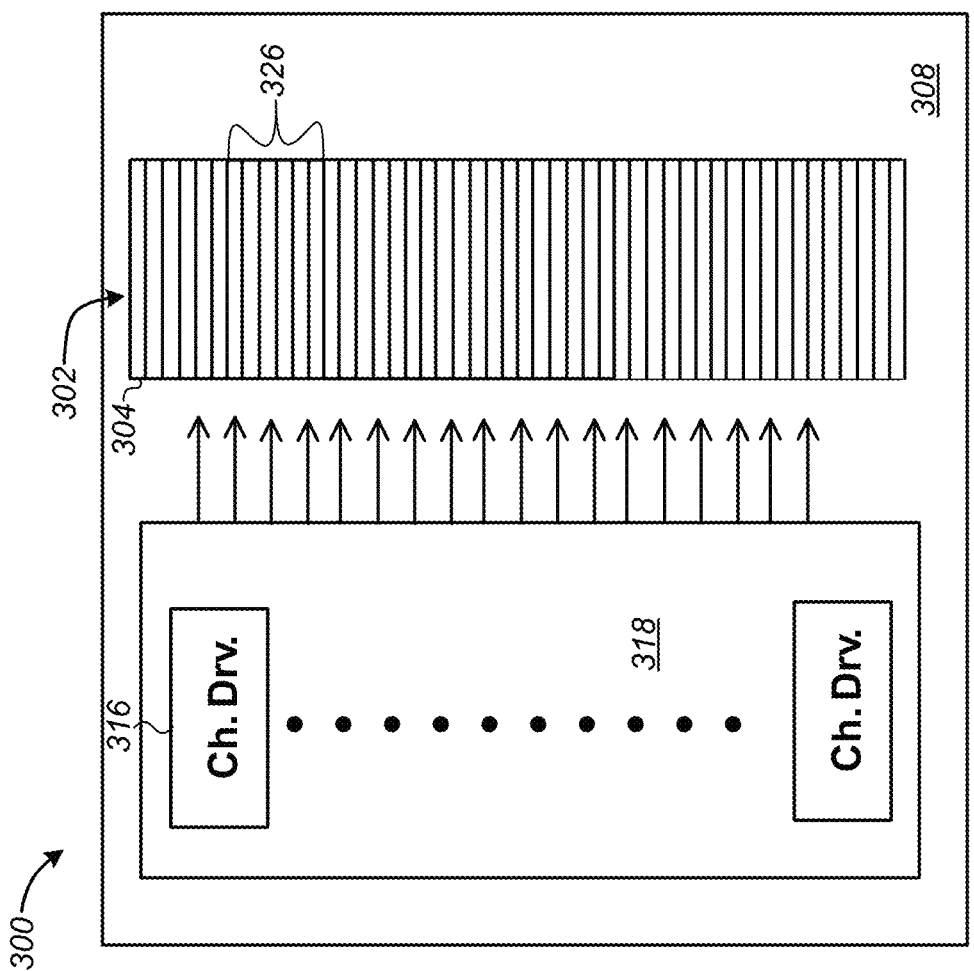
FIG. 3B
FIG. 3A

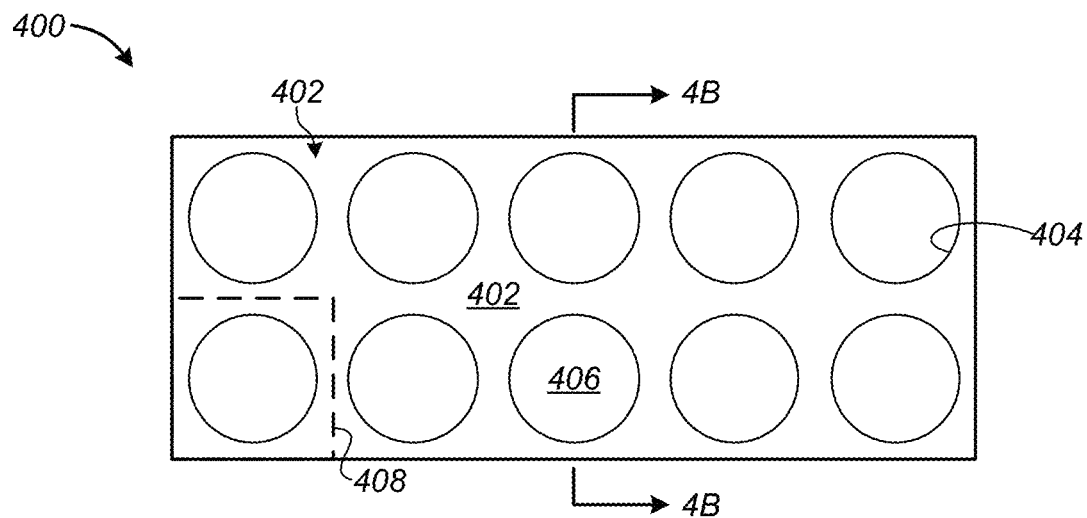
FIG. 4A
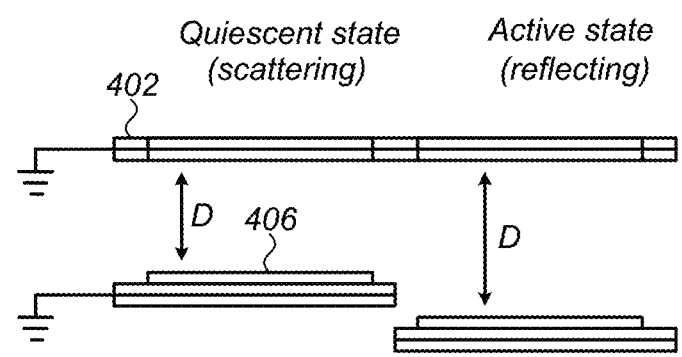
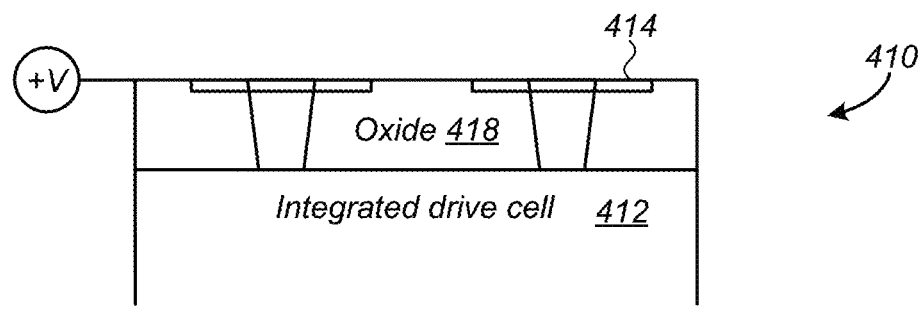
FIG. 4B

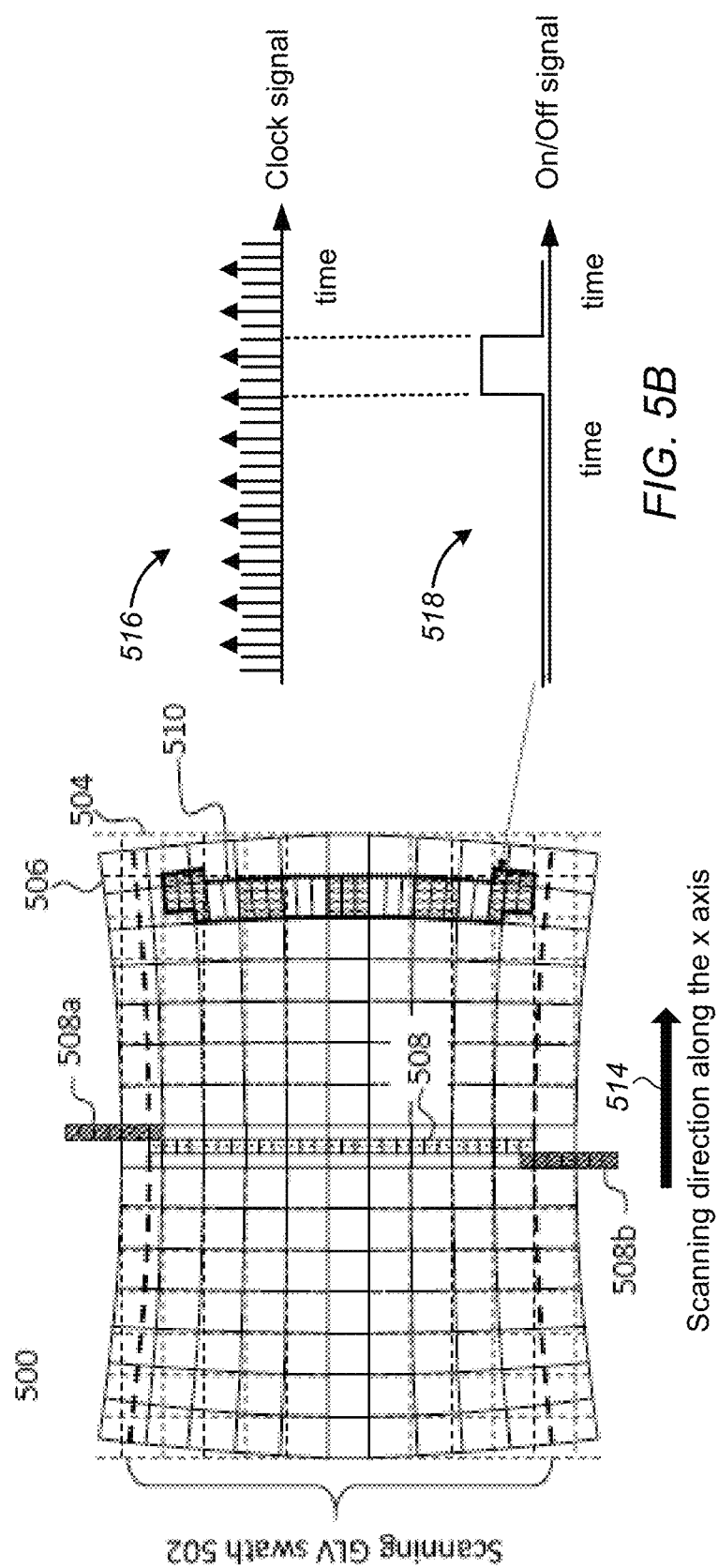

COMPENSATION METHOD FOR A SCANNING SYSTEM WITH SPATIAL LIGHT MODULATOR

CROSS-REFERENCE TO RELATED APPLICATIONS

This application claims the benefit of priority under 35 U.S.C. 119(e) to U.S. Provisional Patent Application Ser. No. 62/752,939, filed Oct. 30, 2018, which is incorporated by reference herein in its entirety.

TECHNICAL FIELD

The present invention relates generally to scanning systems used with spatial light modulators (SLMs), and more particularly to multibeam scanning systems and methods for operating the same to compensate for distortion.

BACKGROUND

Scanning systems are commonly used to form an image or pattern in a media or an imaging plane for displays printing, three-dimensional (3D) printing, metal engraving, and selective laser melting.

Referring to FIG. 1, scanning systems 100 generally include a spatial light modulator (SLM 102) to modulate light from a light source 104, a collimate lens 106 to form and direct multiple parallel beams from the SLM onto a scan mirror 108, and an imaging lens 110 to magnify and project modulated light from the scan mirror onto an imaging plane 112. The scan mirror 108 generally rotates around two axes to scan the modulated light over the imaging plane 112 to form an image or pattern.

One problem with conventional scanning systems, particularly those used to form an image or pattern on a two-dimensional (2D) imaging plane using multiple beams from a SLM 102, is that due to characteristics of imaging lenses used in these systems off-axis beams of multiple beams cannot scan parallel resulting in a distortion error that cannot be compensated for by increasing or controlling the speed of the scan mirror. That is a beam which has angle θ against an optical axis 114 of the imaging lens 110 settles at a position that is at a distance of fθ from a center of a swath or image 120 of the SLM 102 projected onto the imaging plane 112. This distance from the center of the image 120 increases as a function of the angle θ moving outward along the x-axis resulting in stretched or elongated, distorted image along the x-axis. Furthermore when the scan mirror is also rotated along a y-axis there is also distortion along the y-axis. Referring to FIG. 1, a dashed line 116 represents the desired or ideal location of a grid of images 120 of the SLM 102 projected and scanned along the x-axis on the imaging plane 112 while solid black lines 118 indicates a grid of the actual location of images of the SLM.

Accordingly, there is a need for a scanning system and a method for operating the same to compensate for distortion due to multi beam scanning optics.

SUMMARY

A multi-beam scanning system and methods of operating the same to compensate for distortion. are provided.

In a first aspect, the method involves illuminating a spatial light modulator including a number of SLM pixels arranged in parallel, each pixel including a multiple address pixels. Drive signals including image data are provided to the pixels to generate beams of modulated light reflected therefrom, which is scanned to a linear swath of a two-dimensional imaging plane using a collimate lens, a scan mirror moved about a first axis, and an imaging lens. The swath is scanned across the imaging plane in a direction orthogonal to a long axis of the swath by moving the scan mirror about a second axis. To compensate for distortion along the long axis of the swath compensated image data is provided to at least some of the address pixels generating beams of modulated light distal from an optical axis of the imaging lens. In one embodiment, the number of SLM pixels includes three address pixels, wherein at least some of the address pixels of outer pixels distal the optical axis illuminate a portion of the linear swath overlapping that illuminated by address pixels of a center pixel.

In another embodiment, the method further involves delaying drive signals to the address pixels generating beams of modulated light distal from an optical axis of the imaging lens as the linear swath is scanned across the 2D imaging plane in the direction orthogonal to the long axis of the linear swath to compensate for distortion along an long axis of the direction of the scan.

In another aspect of the present disclosure, a multi-beam scanning system is provided capable of performing at least one of the embodiments of the above method to render substantially distortion free images on a 2D imaging plane. Generally, the system includes a SLM including multiple SLM pixels, each including a number of address pixels arranged in parallel along long axes of the SLM pixels and driven by a single channel of multiple drive channels. Each of the number of SLM pixels includes multiple address pixels. The system further includes an illuminator including a light source and illumination optics to illuminate reflective surfaces of the plurality of SLM pixels in the SLM, and imaging optics including a collimate lens, an imaging lens, and a scan mirror capable of being moved about at least a first and a second axes. A controller coupled to the SLM, illuminator and imaging optics is configured to control the SLM, light source and scan mirror to modulate light incident on the SLM and to scan beams of modulated light reflected from the SLM pixels to a substantially linear swath of the 2D imaging plane and to scan the linear swath across the 2D imaging plane in a direction orthogonal to a long axis of the linear swath. In one embodiment, the controller is configured to provide drive signals including image data to the number of SLM pixels and to provide compensated image data to address pixels generating beams of modulated light beam distal from an optical axis of the imaging lens. In another embodiment, the controller is further configured to delay drive signals to the address pixels generating beams of modulated light distal from an optical axis of the imaging lens as the linear swath is scanned across the 2D imaging plane in the direction orthogonal to the long axis of the linear swath.

BRIEF DESCRIPTION OF THE DRAWINGS

Embodiments of the present invention will be understood more fully from the detailed description that follows and from the accompanying drawings and the appended claims provided below, where:

FIG. 3A is a schematic block diagram of an embodiment of a ribbon-type spatial light modulator (SLM) suitable for use in multi-beam scanning system according to an embodiment of the present disclosure;

FIG. 3B is a schematic sectional side view of single ribbon of the SLM of FIG. 3A;

FIG. 4A is a schematic block diagram of another embodiment of a MEMS based optical modulator suitable for use in multi-beam scanning system according to an embodiment of the present disclosure;

FIG. 4B is a schematic sectional side view of two adjacent modulators of the array of FIG. 4A;

FIG. 5A is a schematic diagram of a 2D scan of a single, 1D pixel over 2D imaging plane, illustrating a distortion compensating method to compensate for distortion along the pixel or in a direction orthogonal to that of the scan;

FIG. 5B are timing diagrams showing a constant dot clock and on/off signals to control address pixels of off-axis pixels to compensate for distortion in a direction of the scan.

DETAILED DESCRIPTION

Embodiments of scanning systems including MEMS-based spatial light modulators (SLMs) and multi-beam scanning optics, and methods for operating the same to compensate for distortion are disclosed. In the following description, numerous specific details are set forth, such as specific materials, dimensions and processes parameters etc. to provide a thorough understanding of the present invention. However, particular embodiments may be practiced without one or more of these specific details, or in combination with other known methods, materials, and apparatuses. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Figure 2:
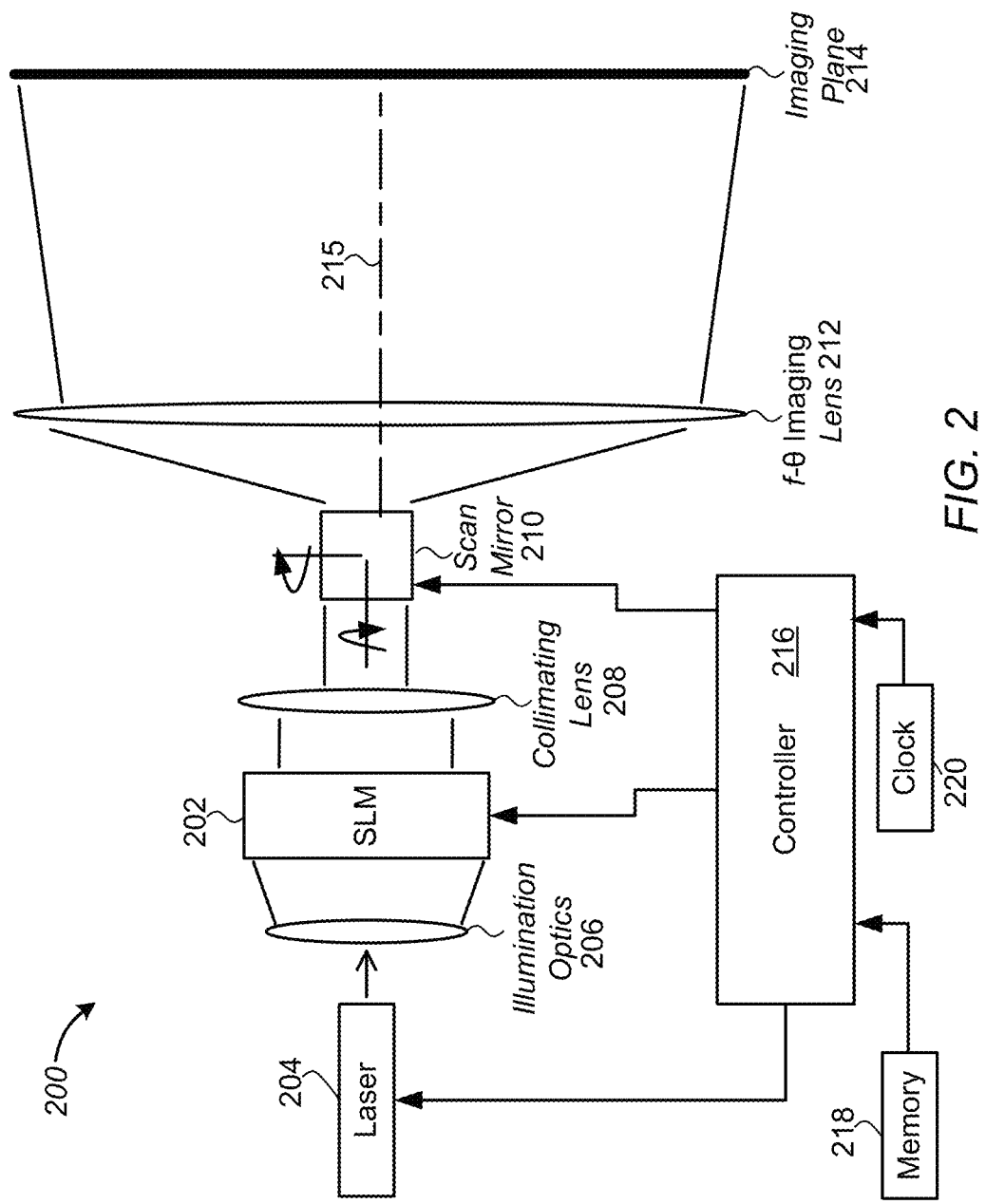
FIG. 2 is a schematic block diagram of multi-beam scanning system according to an embodiment of the present disclosure.

FIG. 2 is a schematic block diagram of multi-beam scanning system capable of being operated to compensate for distortion according to an embodiment of methods of the present disclosure. Referring to FIG. 2, the system 200 generally includes a spatial light modulator (SLM 202) to modulate light from a light source 204, such as a laser, illumination optics 206, which can include numerous elements such as lens integrators, mirrors and prisms, designed to transfer light from the light source 204 to the SLM, a collimate lens 208 to direct multiple beams of modulated light from the SLM onto a scan mirror 210 and a imaging lens 212 to project modulated light onto a one or two dimensional imaging plane 214. Generally, as in the embodiment shown the scan mirror 210 is capable of movement along at least two non-parallel axes to form a substantially linear swath of illumination across a two-dimensional (2D) imaging plane 214, and to scan the linear swath across the 2D imaging plane in a direction orthogonal to a long axis of the linear swath. The imaging lens 212 can include an f-theta (fθ) lens to provide a flat field at the imaging plane 214 of the scanning system 200.

Additionally, the scanning system 200 further includes a controller 216 to control operation of the light source 204, provide image data and drive signals to SLM 202 and to control the scan mirror 210. As explained in greater detail below, the controller 216 is configured to provide image data to each of a number of SLM pixels in the SLM 202, including providing compensated image data to at least some address pixels of the SLM pixels generating beams of modulated light beam distal from an optical axis of the imaging lens 212 to compensate for distortion along the long axis of the linear swath illuminated across the 2D imaging plane. Preferably, the scanning system 200 further includes a memory 218 coupled to or integrated with the controller 216 to store, for example in a lookup table, compensating data derived from an algorithm executed in the controller for each address pixel in the SLM 202. Data derived from the algorithm and stored in the memory for each address pixel is combined or concatenated with image data with image data received for each SLM pixel to derive the compensated image data.

More preferably, the scanning system 200 further includes a dot clock or clock 220 coupled to or integrated with the controller 216 and the controller is further configured to delay drive signals to the address pixels generating beams of modulated light distal from an optical axis 215 of the imaging lens 212 as the linear swath is scanned across the 2D imaging plane in the direction orthogonal to the long axis of the linear swath to compensate for distortion along a long axis of the direction of the scan.

One type of MEMS based SLM suitable for use in a multi-beam scanning system according to an embodiment of the present disclosure is a ribbon-type SLM, such as a Grating Light Valve (GLV™), commercially available from Silicon Light Machines, in Sunnyvale Calif.

An embodiment of a ribbon-type SLM will now be described with reference to FIGS. 3A and 3B. For purposes of clarity, many of the details of MEMS in general and MEMS optical modulators in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Referring to FIGS. 3A and 3B in the embodiment shown the SLM 300 includes a linear array 302 composed of thousands of free-standing, addressable electrostatically actuated ribbons 304, each having a light reflective surface 306 supported over a surface of a substrate 308. Each of the ribbons 304 includes an electrode 310 and is deflectable through a gap or cavity 312 toward the substrate 308 by electrostatic forces generated when a voltage is applied between the electrode in the ribbons and a base electrode 314 formed in or on the substrate. The ribbons 304 are driven by a drive channel 316 in a driver 318, which may be integrally formed on the same substrate 308 with the array 302.

A schematic sectional side view of a movable structure or ribbon 304 of the SLM 300 of FIG. 3A is shown in FIG. 3B. Referring to FIG. 3B, the ribbon 304 includes an elastic mechanical layer 320 to support the ribbon above a surface 322 of the substrate 308, a conducting layer or electrode 310 and a reflective layer 324 including the reflective surface 306 overlying the mechanical layer and conducting layer.

Generally, the mechanical layer 320 comprises a taut silicon-nitride film (SiNx), and flexibly supported above the surface 322 of the substrate 308 by a number of posts or structures, typically also made of SiNx, at both ends of the ribbon 304. The conducting layer or electrode 310 can be formed over and in direct physical contact with the mechanical layer 320, as shown, or underneath the mechanical layer. The conducting layer or ribbon electrode 310 can include any suitable conducting or semiconducting material compatible with standard MEMS fabrication technologies. For example, the conducting layer 310 can include a doped polycrystalline silicon (poly) layer, or a metal layer. Alternatively, if the reflective layer 324 is metallic it may also serve as the conductive layer 312.

The separate, discrete reflecting layer 324, where included, can include any suitable metallic, dielectric or semiconducting material compatible with standard MEMS fabrication technologies, and capable of being patterned using standard lithographic techniques to form the reflective surface 306. In the embodiment shown, a number of ribbons are grouped together under to form a large number of MEMS pixels 326 driven by a much smaller number of drive channels 316.

Another type of MEMS-based optical modulator for which the distributed mirror of the present invention is particularly useful is a Planar Light Valve or PLV™ from Silicon Light Machines, Inc., of Sunnyvale, Calif. Referring to FIGS. 4A through 4D, a planar type light valve or PLV™ 400 generally includes two films or membranes having light reflecting surfaces of equal area and reflectivity disposed above an upper surface of a substrate (not shown in this figure). The topmost film is a static tent member or face-plate 402 of a uniform, planar sheet of a material having a first planar light reflective distributed mirror or reflector 403, for example taut silicon-nitride covered on a top surface with one or more layers of material reflective to at least some of the wavelengths of light incident thereon. The face-plate 402 has an array of apertures 404 extending from the top distributed mirror 403 of the member to a lower surface (not shown). The face-plate 402 covers an actuator membrane underneath. The actuator membrane includes a number of flat, displaceable or movable actuators 406. The actuators 406 have second planar distributed mirror or reflector 407 parallel to the first planar distributed mirror 403 of the face-plate 402 and positioned relative to the apertures 404 to receive light passing therethrough. Each of the actuators 406, the associated apertures 404 and a portion of the face-plate 402 immediately adjacent to and enclosing the aperture form a single, individual modulator 408 or diffractor. The size and position of each of the apertures 404 are chosen to satisfy an "equal reflectivity" constraint. That is the area of the second distributed mirror 407 exposed by a single aperture 404 inside is substantially equal to the reflectivity of the area of the individual modulator 408 outside the aperture 404.

FIG. 4B depicts a cross-section through two adjacent modulators 408 of the light valve 400 of FIG. 4A. In this exemplary embodiment, the upper face-plate 402 remains static, while the lower actuator membrane or actuators 406 move under electrostatic forces from integrated electronics or drive circuitry in the substrate 410. The drive circuitry generally includes an integrated drive cell 412 coupled to substrate or drive electrodes 414 via interconnect 416. An oxide 418 may be used to electrically isolate the electrodes 414. The drive circuitry is configured to generate an electrostatic force between each electrode 414 and its corresponding actuator 406.

Individual actuators 406 or groups of actuators are moved up or down over a very small distance (typically only a fraction of the wavelength of light incident on the light valve 400) relative to first planar distributed mirror 403 of the face-plate 402 by electrostatic forces controlled by drive electrodes 414 in the substrate 410 underlying the actuators 406. Preferably, the actuators 406 can be displaced by $n*\lambda/4$ wavelength, where $\lambda$ is a particular wavelength of light incident on the first and second planar distributed mirrors 403, 407, and n is an integer equal to or greater than 0. Moving the actuators 406 brings reflected light from the second planar distributed mirror 407 into constructive or destructive interference with light reflected by the first planar distributed mirror 403 (i.e., the face-plate 402), thereby modulating light incident on the light valve 400.

For example, in one embodiment of the light valve 400 shown in FIG. 4B, the distance (D) between reflective layers of the face-plate 402 and actuator 406 may be chosen such that, in a non-deflected or quiescent state, the face-plate, or more accurately the first distributed mirror 403, and the actuator (second distributed mirror 407), are displaced from one another by an odd multiple of $\lambda/4$, for a particular wavelength $\lambda$ of light incident on the light valve 400. This causes the light valve 400 in the quiescent state to scatter incident light, as illustrated by the left actuator of FIG. 4B. In an active state for the light valve 400, as illustrated by the right actuator of FIG. 4B, the actuator 406 may be displaced such that the distance between the distributed mirrors 403, 407 of the face-plate 402 and the actuator 406 is an even multiple of $\lambda/4$ causing the light valve 400 to reflect incident light.

Figure 1:
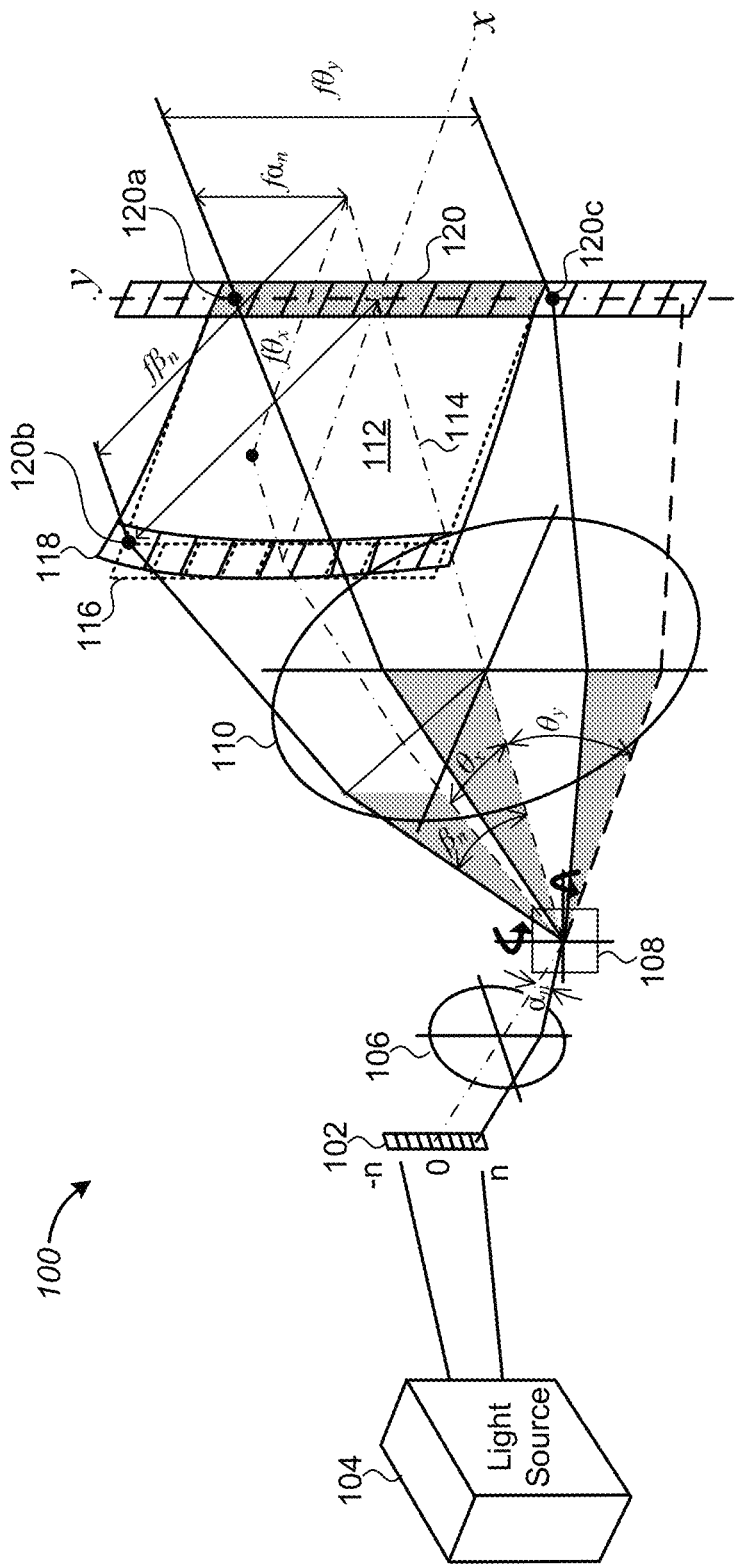
FIG. 1 is a schematic diagram illustrates the distortion error in an image on a two-dimensional (2D) imaging plane due to multi beam scanning optics.

As noted above, one problem with conventional scanning systems, particularly those used to form an image or pattern on a 2D imaging plane using multiple beams from a SLM, is that due to characteristics of fθ imaging lenses off-axis beams cannot scan parallel resulting in distortion. Referring to FIG. 1, the shaded area 120 represents a swath or projected image of a SLM 102 on the optical axis. Point or location 120a is the image of the n-th pixel of the SLM 102. When the scanning mirror 108 rotates as to scan along the x-axis, trajectory of the n-th pixel which is off the x-axis does not move parallel because the location 120b is proportional to the angle against the optical axis 114. The projected SLM image can also be scanned along they y axis and the point or location 120c represent the n-th pixel when the scanning mirror 108 rotates as to set n-th pixel at next to the (−n)-th pixel. The dashed line 116 represents the desired or ideal location of a grid (trajectory of the image of the SLM) projected on the imaging plane 112 while solid black lines 118 indicates the actual location. In this embodiment the cell size along the x axis of the grid correspond to the size of a projected single pixel and is same as resolution of the imaging system. The cell size along the y axis shows the pitch which SLM can be driven between on state and off state at constant time interval. The frequency of this constant time interval is referred to hereinafter as a "Dot clock." During scanning the projected pixel on the x axis ($0^{th}$ pixel in this embodiment) moves at a constant speed and the pitch along the x axis is constant. However, for the pixels off the x axis the pitch is uneven. The distorted, actual location of a pixel ($x_n$, $y_n$) on the imaging plane 112 of a particular beam in the image is given by the equations below, where: f is the focal length of the f-theta lens 110; $\theta_x$ is the scanned angle along the x axis; $\theta_y$ is the scanned angle along the y axis; $\alpha_n$ is the incident angle of the n-th pixel on the scanning mirror; and $\beta_n$ is the scanned angle of the n-th pixel against optical axis.

$$x_n(\theta_x, \theta_y) = f\beta_n \frac{\sin\theta_x}{\sqrt{\sin^2\theta_x + \tan^2(\alpha_n + \theta_y)}}$$

$$y_n(\theta_x, \theta_y) = f\beta_n \frac{\tan(\alpha_n + \theta_y)}{\sqrt{\sin^2\theta_x + \tan^2(\alpha_n + \theta_y)}}$$

$$\beta_n = \cos^{-1}\left(\frac{\cos\theta_x}{\sqrt{1 + \tan^2(\alpha_n + \theta_y)}}\right)$$

A method of operating a scanning system of FIG. 2 including a MEMS-based SLM and multi-beam scanning optics to compensate for distortion will now be described with reference to FIG. 2 and FIGS. 5A and 5B.

Briefly, the method compensates for distortion by providing smaller controlled pitch for both scanning direction and pixels arranged direction on an image plane than a required resolution for forming an image. For example, resolution of a 3D printer using selective laser sintering (SLS) requires a resolution with pixels of about 60 μm for building 3D parts, while magnification of a projection lens of the scanning system of can be configured to have a pixel pitch of about 20 μm on the image plane. Thus, the actual size of a projected single pixel of the SLM doesn't need to resolve 20 μm; 60 μm provides sufficient resolution for 3D printing using SLS. This difference between the resolution or pixel size the scanning system is capable of providing and that required for a particular application, i.e., 3D printing using SLS, enables increase control of pitch along the pixel arranged direction to compensate for distortion.

As for distortion in the scanning direction, a clock for controlling on/off states of pixels of the SLM can be increased by three times from the original dot clock frequency to increase controlling pitch. For example in a conventionally operated scanning system used for 3D printing the dot clock is operated at a frequency selected to draw dots or pixels on the image plane every 60 μm. To compensate for distortion in the scanning direction a scanning system operated according to the method of the present invention uses an increased clock, referred to hereinafter as a sub-clock, which can change image data every 20 μm. These increased controlling pitches for both directions are generally called "address pitch" or "address size." The grid written by address pitch is called "address grid." This address grid is also distorted due to characteristics of imaging lens. By using the address grid the distorted image can be compensated.

FIG. 5A illustrates a scanned swath 502 of light modulated by a MEMS-based SLM across an imaging plane 500. A grid shown in dashed lines 504 illustrates the desired or ideal resolution of pixels projected on the imaging plane. An actual, uncompensated pattern of pixels is shown by a grid shown in solid lines 506, and is a result of distortion characteristics of the fθ imaging lens 212 and off-axis beams, such as that shown in FIG. 2. A linear array of square boxes 508 on the center of the imaging plane 500 is the projected image of entire pixels of SLM. A cell of the grid 506 is a minimum feature or resolution of the image plane 500 to form images and it consists of at least three (3) address pixels along the vertical direction. Each pixel is shown as a square box in this drawing but actual pixel image does not need to have the same size as the box shown because required resolution is the size of the grid 506. By scanning the array 508 along horizontal direction smaller grid (it is not shown in the drawing) is to be formed within the swath 502 As stated above, the grid is called address grid along the vertical direction. The address grid is also distorted. There are arrays 508a and 508b on the upper and lower sides. These arrays are projected images of SLM when they are moved along the vertical direction by the scanning mirror. These arrays 508a and 508b form other swaths on the upper and lower sides by scanning horizontally. As the higher location pixels are projected from the horizontal center axis and the farther pixels are scanned from the vertical center axis, deviation from ideal location in a vertical direction gets larger.

The column 510 which is written on/off pattern (gray cells are on and white cells are off) is the example of compensated image. Distortion in a vertical direction or longitudinal axis of the grid 506 caused by the fθ imaging lens 212 is monotonically increases as a function of the scan mirror angle of the scanning system 200. In the column 510, pixels (or address grids) in the fourth cell of the grid 506 from the center cell cannot fill out the fourth cell of the ideal grid 504 which is in the on state region, so the outer pixel in the fourth cell of the grid 506 should be set on-state to fit the ideal grid 504. The equation $y_n(\theta_x, \theta_y)$ as shown above tells where a pixel belong to in the ideal grid 504. Thus pixels can be driven by compensated image data that vary as a function of the scan mirror 210 angle. The compensated image data can be stored as a function of the angle of the scan mirror 210 in the memory 218 coupled to or integrated with the controller 216.

Distortion along the vertical or longitudinal axis in the swathes which are made by projected SLM image 508a and 508b outside of center swath 502 is increasing further because angles against optical axis are getting bigger. Optionally it is important to overlap at least some pixels of 508a of the neighbor swath of the swath 502 with pixels of 508 in the center swath 502, as shown in FIG. 5A because it is hard to get the same shape between the horizontal scan line of the upper-side end pixel of 508 and the one of lower-side end pixel of 508a because horizontal rotating axis generally does not locate in the same plane where the vertical rotating axis exists. Ideally these axes should be in the same plane, pupil plane of the fθ imaging lens. This difference makes such an error. In addition, this of overlapping pixels also improves stitching between SLM pixels 508a through 508b.

To compensate for distortion in a horizontal direction, or along a direction of the scan (indicated by arrow 514), drive signals to each pixel of 508 can be delayed by providing an on/off signal. Referring to FIGS. 2 and 5B, the scanning system further includes a dot clock or clock 222 used to generate a dot clock signal shown as arrows in 516 used by the controller 216 to generate an on/off signal 518 to delay drive signals to the pixels 508 generating beams of modulated light distal from the optical axis 215 of the imaging lens 212 as the linear swath 502 is scanned across the 2D imaging plane 500 in a direction orthogonal to the long axis of the linear swath to compensate for distortion along an long axis of the scan direction 514. Generally, dot clock is proportional to the cell size of the grid 506 and resolution of delay depends on the design how much the clock should be divided into. The resolution of delay in FIG. 5B is one third of the dot clock and we call it "address clock." On/off signal 518 shows the one of the pixel which is pointed out by the arrow in FIG. 5A. Distortion in a direction of horizontal axis is that cell size of grid 506 is getting shorter as scan angle is increasing. To compensate for it the signal to change from on to off is delayed by one digit to fit the ideal grid 504. As with the compensated image data used to compensate for distortion along the longitudinal axis of the linear swath 502, these delays for each pixel of 508 are substantially constant for the scan system 200 at a given scan speed, and thus can be stored in a look table in the memory 220, which is accessed by the controller during operation of the system, rather calculated for each address pixel during each scan.

Figure 6:
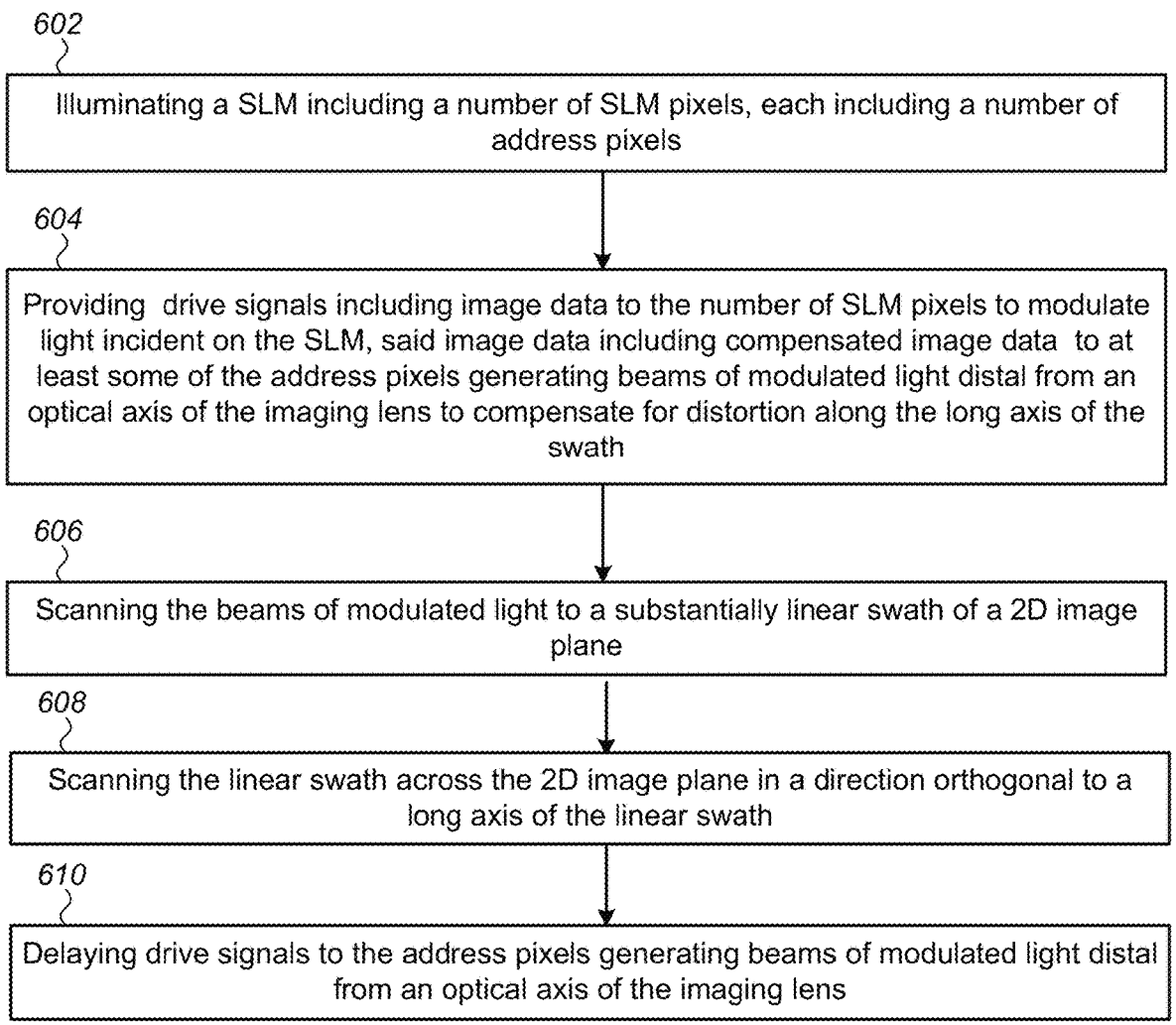
FIG. 6 is a flowchart illustrating a method of operating a scanning system including a MEMS-based spatial light modulators (SLM) and multi-beam scanning optics to compensate for distortion.

FIG. 6 is a flowchart illustrating a method of operating the above described scanning system including a MEMS-based SLM and multi-beam scanning optics to compensate for distortion. Referring to FIG. 6, the method begins with illuminating a spatial light modulator (SLM) including a number of SLM pixels arranged parallel or co-axially along long axes of the pixels and driven by a single channel, wherein each pixel includes a number of address pixels (602). Next, image data and drive signals are provided to the number of SLM pixels to modulate light incident on the SLM to generate beams of modulated light from the number of SLM pixels and address pixels (604). Preferably, as described above, providing image data to each of the number of SLM pixels includes providing compensated image data to at least some of the address pixels generating beams of modulated light beam distal from an optical axis of the imaging lens to compensate for distortion along the long axis of the linear swath. The beams of modulated light are scanned over a two-dimensional (2D) imaging plane to form a substantially linear swath of illumination using a collimate lens, a scan mirror moved about a first axis, and an imaging lens (606). Next, the linear swath is scanned across the 2D imaging plane in a direction orthogonal to a long axis of the linear swath using the scan mirror moved about a second axis (608). Optionally, the method further includes delaying drive signals to the address pixels generating beams of modulated light distal from an optical axis of the imaging lens as the linear swath is scanned across the 2D imaging plane in the direction orthogonal to the long axis of the linear swath to compensate for distortion along an long axis of the direction of the scan (610).

Thus, embodiments of a multi-beam scanning system, and methods for operating the same to compensate for distortion have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A method of operating a multi-beam scanning system comprising:
    illuminating a spatial light modulator (SLM) including a number of SLM pixels arranged in parallel along a long axis of the SLM, each SLM pixel having a first pixel pitch and including a plurality individually addressable address pixels having a second pixel pitch smaller than the first pixel pitch;
    providing drive signals including image data to the SLM pixels to modulate light incident thereon to generate beams of modulated light reflected from the SLM;
    scanning the beams of modulated light to a substantially linear swath of a two-dimensional (2D) imaging plane using a collimate lens, a scan mirror moved about a first axis, and an imaging lens; and
    scanning the linear swath across the 2D imaging plane in a direction orthogonal to a long axis of the linear swath using the scan mirror moved about a second axis,
    wherein providing drive signals including image data to SLM pixels comprises providing compensated image data to address pixels of each SLM pixel generating beams of modulated light distal from an optical axis of the imaging lens,
    wherein the number of SLM pixels comprises at least two SLM pixels including a number of address pixels arranged so that modulated light beams originating from address pixels in each of the two SLM pixels overlaps in the linear swath scanned onto the 2D imaging plane.

2. The method of claim 1 wherein providing compensated image data to address pixels comprises providing compensated image data for each address pixel (n) derived based on angles of the scan mirror relative to the optical axis of the imaging lens for a modulated light beam originating from the nth address pixel.

3. The method of claim 2 wherein the compensated image data derived is stored in a memory coupled to the SLM, and wherein providing compensated image data to address pixels comprises looking up compensated image data for each address pixel and combining said compensated image data with image data for each SLM pixel.

4. The method of claim 1 wherein the imaging lens comprises an f-theta lens.

5. The method of claim 4 wherein providing compensated image data to address pixels comprises providing compensated image data for each address pixel (n) derived based on:

a focal length of f-theta lens, a first angle (θ) through which the scan mirror is moved about the first axis relative to the optical axis;

an incident angle (αn) of a modulated light beam originating from the nth address pixel on the collimate lens relative to an optical axis of the collimate lens; and a scanned angle (βn) of a modulated light beam originating from the nth address pixel on the imaging lens relative to the optical axis of the imaging lens.

6. The method of claim 1 further comprising delaying drive signals to the address pixels generating beams of modulated light distal from an optical axis of the imaging lens as the linear swath is scanned across the 2D imaging plane in the direction orthogonal to the long axis of the linear swath.

7. A method of operating a multi-beam scanning system comprising:

illuminating a spatial light modulator (SLM) including a SLM pixel including a plurality of address pixels;

providing drive signals including image data to the SLM pixel to modulate light incident thereon to generate beams of modulated light reflected from the SLM pixel;

scanning the beams of modulated light to a substantially linear swath of a two-dimensional (2D) imaging plane using a collimate lens, a scan mirror moved about a first axis, and an imaging lens; and scanning the linear swath across the 2D imaging plane in a direction orthogonal to a long axis of the linear swath using the scan mirror moved about a second axis, wherein providing drive signals including image data to the SLM pixel comprises delaying drive signals to at least some of the address pixels generating beams of modulated light distal from an optical axis of the imaging lens as the linear swath is scanned across the 2D imaging plane in the direction orthogonal to the long axis of the linear swath relative to drive signals provided to address pixels generating beams of modulated light proximal from to the optical axis.

8. The method of claim 7 wherein delaying drive signals to at least some of the address pixels comprises looking up a predetermined delay for each address pixel in a memory coupled to the SLM.

9. The method of claim 8 wherein providing drive signals including image data further comprises providing compensated image data to address pixels generating beams of modulated light beam distal from the optical axis of the imaging lens.

10. The method of claim 9 wherein providing compensated image data to address pixels comprises providing compensated image data for each address pixel (n) derived based on angles of the scan mirror relative to the optical axis of the imaging lens for a modulated light beam originating from the nth address pixel.

11. The method of claim 9 wherein the compensated image data derived is stored in the memory coupled to the SLM, and wherein providing compensated image data to address pixels comprises looking up compensated image data for each address pixel.

12. The method of claim 9 wherein providing compensated image data to address pixels comprises providing compensated image data for each address pixel (n) derived based on:

a focal length of the imaging lens, a first angle (θ) through which the scan mirror is moved about the first axis relative to the optical axis;

an incident angle (αn) of a modulated light beam originating from the nth address pixel on the collimate lens relative to an optical axis of the collimate lens; and a scanned angle (βn) of a modulated light beam originating from the nth address pixel on the imaging lens relative to the optical axis of the imaging lens.

13. The method of claim 7 wherein the SLM comprises at least two SLM pixel arranged in parallel along long axes of the SLM pixels, and wherein each of the at least two SLM pixel include a number of address pixels arranged so that modulated light beams originating from address pixels in each of the two SLM pixel overlaps in the linear swath scanned onto the 2D imaging plane.

14. A multi-beam scanning system comprising:

a spatial light modulator (SLM) comprising a plurality of SLM pixels including a number of SLM pixels arranged in parallel along long axes of the SLM pixels and driven by a single channel of a plurality of drive channels, each of the number of SLM pixels including a plurality of address pixels;

an illuminator including a light source and illumination optics to illuminate reflective surfaces of the plurality of SLM pixels in the SLM;

imaging optics including a collimate lens, an imaging lens, and a scan mirror capable of being moved about at least a first and a second axes;

a controller coupled to the SLM, illuminator and imaging optics to control the SLM, light source and scan mirror to modulate light incident on the SLM and to scan beams of modulated light reflected from the SLM pixels to a substantially linear swath of a two-dimensional (2D) imaging plane and to scan the linear swath across the 2D imaging plane in a direction orthogonal to a long axis of the linear swath, wherein the controller is configured to provide drive signals including image data to the number of SLM pixels and to provide compensated image data to address pixels generating beams of modulated light beam distal from an optical axis of the imaging lens, wherein the controller is configured to delay drive signals to the address pixels generating beams of modulated light distal from an optical axis of the imaging lens as the linear swath is scanned across the 2D imaging plane in the direction orthogonal to the long axis of the linear swath.

15. The system of claim 14 wherein the controller is configured to provide compensated image data to the address pixels that is derived based on angles of the scan mirror relative to the optical axis of the imaging lens for a modulated light beam originating from the nth address pixel.

16. The system of claim 15 further comprising a memory coupled to the controller, and wherein the controller is configured to provide compensated image data to the address pixels from compensated image data stored in a lookup table in the memory for each address pixel.

17. The system of claim 14 wherein the SLM comprises a Planar Light Valve ™.

18. The system of claim 14 wherein the SLM comprises a ribbon-type spatial light modulator.

19. A three-dimensional (3D) printing system comprising the multi-beam scanning system of claim 14.

20. The method of claim 12 wherein the multi-beam scanning system is included within a three-dimensional (3D) printing system, and wherein the 2D imaging plane comprises a surface of 3D printing media.

* * * * *